United States Patent
Nakamura

(10) Patent No.: US 10,969,591 B2
(45) Date of Patent: Apr. 6, 2021

(54) IMAGE CORRECTION APPARATUS, IMAGE CORRECTION METHOD AND PROGRAM

(71) Applicant: Sony Interactive Entertainment Inc., Tokyo (JP)

(72) Inventor: Nobuyuki Nakamura, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/766,864

(22) PCT Filed: Dec. 5, 2018

(86) PCT No.: PCT/JP2018/044798
§ 371 (c)(1),
(2) Date: May 26, 2020

(87) PCT Pub. No.: WO2019/116994
PCT Pub. Date: Jun. 20, 2019

(65) Prior Publication Data
US 2020/0319463 A1 Oct. 8, 2020

(30) Foreign Application Priority Data
Dec. 12, 2017 (JP) .............................. JP2017-238042

(51) Int. Cl.
*G02B 27/01* (2006.01)
(52) U.S. Cl.
CPC ..... *G02B 27/0172* (2013.01); *G02B 27/0179* (2013.01); *G02B 2027/014* (2013.01);
(Continued)
(58) Field of Classification Search
CPC ............ G02B 27/0172; G02B 27/0179; G02B 2027/0138; G02B 2027/014;
(Continued)

(56) References Cited

U.S. PATENT DOCUMENTS 10,102,666 B2 * 10/2018 Parker .................... G06F 3/038
10,133,073 B2 11/2018 Oto
(Continued)

FOREIGN PATENT DOCUMENTS

JP 2012033038 A 2/2012
JP 2015095045 A 5/2015

OTHER PUBLICATIONS

International Preliminary Report on Patentability and Written Opinion for corresponding PCT Application No. PCT/JP2018/044798, 13 pages, dated Jun. 25, 2020.
(Continued)

*Primary Examiner* — Bryan Earles
(74) *Attorney, Agent, or Firm* — Matthew B. Dernier, Esq.

(57) ABSTRACT

A transmitting and receiving section receives an image rendered on the basis of a position or an orientation of a head mounted display at a first time together with information regarding the position or the orientation at the first time. A correction section corrects the image by acquiring information regarding a position or an orientation of the head mounted display at a second time of displaying the image, translating or rotationally moving a visual field of the head mounted display in a screen coordinate system in response to a difference between the position or the orientation at the first time and the position or the orientation at the second time, and pasting the image on the translated or rotationally moved visual field as a texture.

3 Claims, 8 Drawing Sheets

(52) U.S. Cl.
CPC .......... *G02B 2027/0138* (2013.01); *G02B 2027/0178* (2013.01); *G02B 2027/0187* (2013.01)

(58) Field of Classification Search
CPC .... G02B 2027/0178; G02B 2027/0187; G02B 27/0093; G02B 27/017; G09G 2354/00; G09G 2370/022; G06F 3/147; G06F 3/012; G06F 3/011; H04N 21/44218; H04N 21/4318; H04N 21/4781; H04N 21/816
See application file for complete search history.

(56) References Cited

U.S. PATENT DOCUMENTS

| | | | |
|---|---|---|---|
| 10,684,469 B2 * | 6/2020 | Smith | G09G 5/391 |
| 2016/0282619 A1 | 9/2016 | Oto | |
| 2019/0180471 A1 * | 6/2019 | Mutschler | G06F 3/012 |
| 2019/0333480 A1 * | 10/2019 | Lang | G02B 27/017 |

OTHER PUBLICATIONS

International Search Report for corresponding PCT Application No. PCT/JP2018/044798, 3 pages, dated Feb. 5, 2019.

* cited by examiner

IMAGE CORRECTION APPARATUS, IMAGE CORRECTION METHOD AND PROGRAM

TECHNICAL FIELD

The present invention relates to an apparatus and a method for generating an image and correcting the image.

BACKGROUND ART

A user wears a head mounted display connected to a video game machine on the user's head, and plays a game by operating a controller or the like while viewing a screen displayed on the head mounted display. When wearing the head mounted display, the user does not view anything but a video displayed on the head mounted display and effects of enhancing a sense of immersion into a video world and further improving entertainment of the game are, therefore, produced. Furthermore, by displaying a VR (Virtual Reality) video on the head mounted display, causing the user wearing the head mounted display on the head to rotate the head, and displaying a virtual space where the user can take a 360-degree view, the sense of immersion into the video is further enhanced and operability of an application such as the game is improved.

SUMMARY

Technical Problems

In a case in which the head mounted display takes on a head tracking function and a virtual reality video is generated by changing a viewpoint and a line-of-sight direction to be interlocked with a motion of the user's head, a delay is generated from generation to display of the virtual reality video. As a result, a lag is generated between a direction of the user's head premised at a point in time of generating the video and a direction of the user's head at a point in time of displaying the video on the head mounted display, and the user often falls into a sense of feeling sick (referred to as "VR Sickness (Virtual Realty Sickness)" or the like).

Furthermore, in a case of streaming delivery of the video displayed on the head mounted display from a server, a communication delay is added to the lag, resulting in an increase in a time difference between the point in time of generating the video and the point in time of displaying the video. Moreover, it is difficult to predict a delay by a congestion state of a network and a reception error often occurs.

The present invention has been achieved in light of such problems, and an object of the present invention is to provide an image correction technology capable of correcting an image in response to a delay from generation and delivery of the image to display of the image.

Solution to Problems

To solve the problems, an image correction apparatus according to one mode of the present invention includes: an acquisition section that acquires an image rendered on the basis of a position or an orientation of a head mounted display at a first time together with information regarding the position or the orientation at the first time; and a correction section that corrects the image by acquiring information regarding a position or an orientation of the head mounted display at a second time of displaying the image, translating or rotationally moving a visual field of the head mounted display in a screen coordinate system in response to a difference between the position or the orientation at the first time and the position or the orientation at the second time, and pasting the image on the translated or rotationally moved visual field as a texture.

Another mode of the present invention is an image correction method. This method includes: an acquisition step of acquiring an image rendered on the basis of a position or an orientation of a head mounted display at a first time together with information regarding the position or the orientation at the first time; and a correction step of correcting the image by acquiring information regarding a position or an orientation of the head mounted display at a second time of displaying the image, translating or rotationally moving a visual field of the head mounted display in a screen coordinate system in response to a difference between the position or the orientation at the first time and the position or the orientation at the second time, and pasting the image on the translated or rotationally moved visual field as a texture.

It is noted that conversion of optional combinations of the aforementioned constituent elements and expressions of the invention among a method, an apparatus, a system, a computer program, a data structure, a recording medium, and so forth is also effective as a mode of the present invention.

Advantageous Effect of Invention

According to the present invention, it is possible to correct an image in response to a delay generated from generation and delivery of the image to display of the image.

DESCRIPTION OF EMBODIMENT

Figure 1:
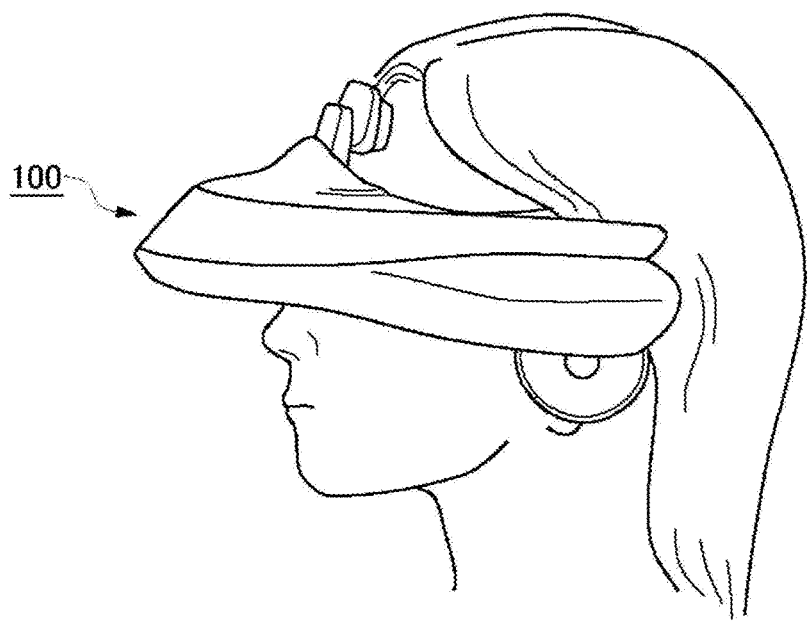
FIG. 1 is an external view of a head mounted display.

FIG. 1 is an external view of a head mounted display 100. The head mounted display 100 is a display apparatus worn on a head of a user so that the user can view a still image, a moving image, or the like displayed on a display and listen to audio, music, or the like output from a headphone.

A gyro sensor, an acceleration sensor, or the like incorporated into or externally attached to the head mounted display 100 can measure position information regarding the head of the user wearing the head mounted display 100 and posture (orientation) information such as a rotational angle and an inclination of the head.

A camera unit is mounted on the head mounted display 100, and the camera unit can capture an image of an outside world while the user is wearing the head mounted display 100.

The head mounted display 100 is an example of a "wearable display." While a method of generating an image displayed on the head mounted display 100 is described herein, the image generation method according to the present embodiment is applicable not only to a case of user's wearing the head mounted display 100 in a narrow sense but also to cases of user's wearing glasses, a glasses display, a glasses camera, headphones, a headset (headphones with a microphone), earphones, an earring, an ear hook camera, a hat, a hat with a camera, a headband, and the like.

Figure 2:
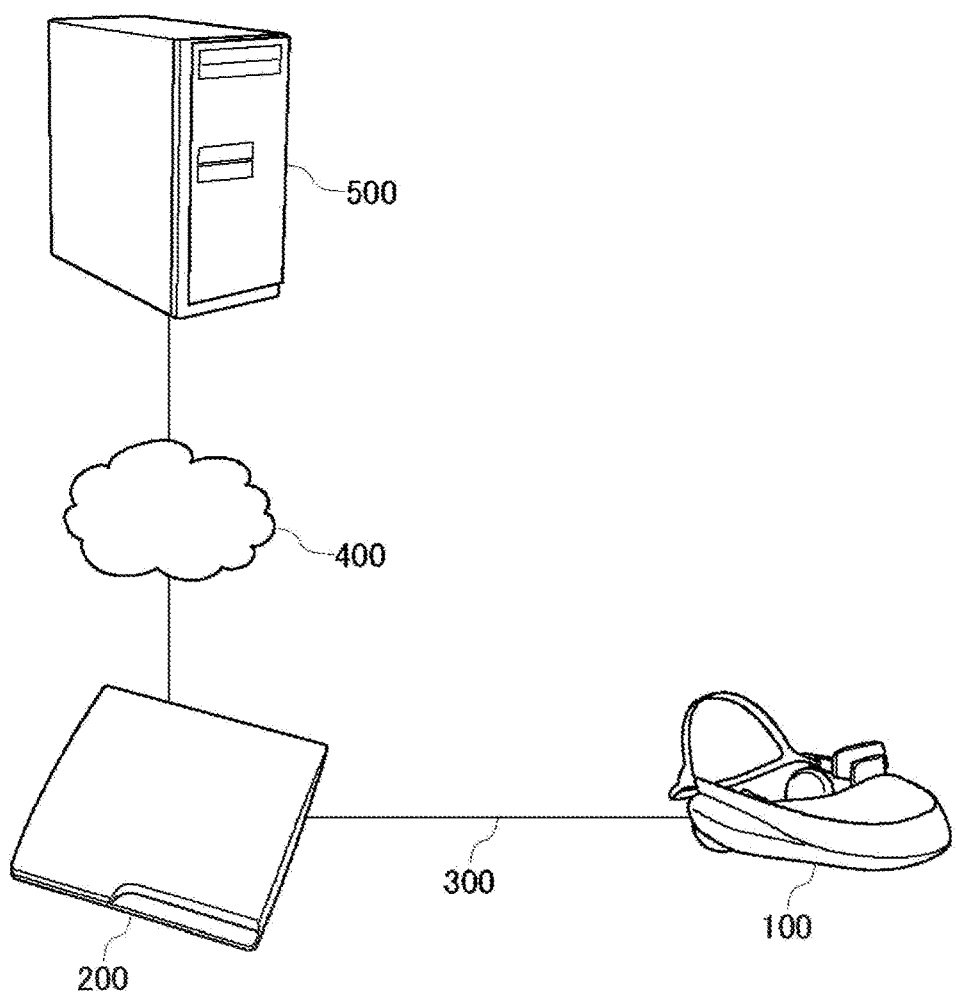
FIG. 2 is a configuration diagram of an image generation system according to an embodiment of the present invention.

FIG. 2 is a configuration diagram of an image generation system according to the present embodiment. By way of example, the head mounted display 100 is connected to an image correction apparatus 200 via an interface 300 such as an HDMI (registered trademark) (High-Definition Multimedia Interface) that is a standard of communication interfaces for transmitting a video and an audio in the form of digital signals.

The image correction apparatus 200 is, for example, a video game machine. The image correction apparatus 200 is connected to an image generation apparatus 500 via a network 400. The image correction apparatus 200 is a client and the image generation apparatus 500 is a server. The image generation apparatus 500 may provide an online application of a game or the like in which a plurality of users can participate via the network, to the image correction apparatus 200.

The image correction apparatus 200 transmits position/orientation information regarding the head mounted display 100 to the image generation apparatus 500. The image generation apparatus 500 renders an image to be displayed on the head mounted display 100 on the basis of the received position/orientation information regarding the head mounted display 100, encodes rendering data, and transmits the encoded rendering data to the image correction apparatus 200 as a video stream. The image correction apparatus 200 decodes the received video stream, corrects the rendering data to be adapted to a latest position/orientation of the head mounted display 100, and displays the corrected rendering data on the head mounted display 100.

Figure 3:
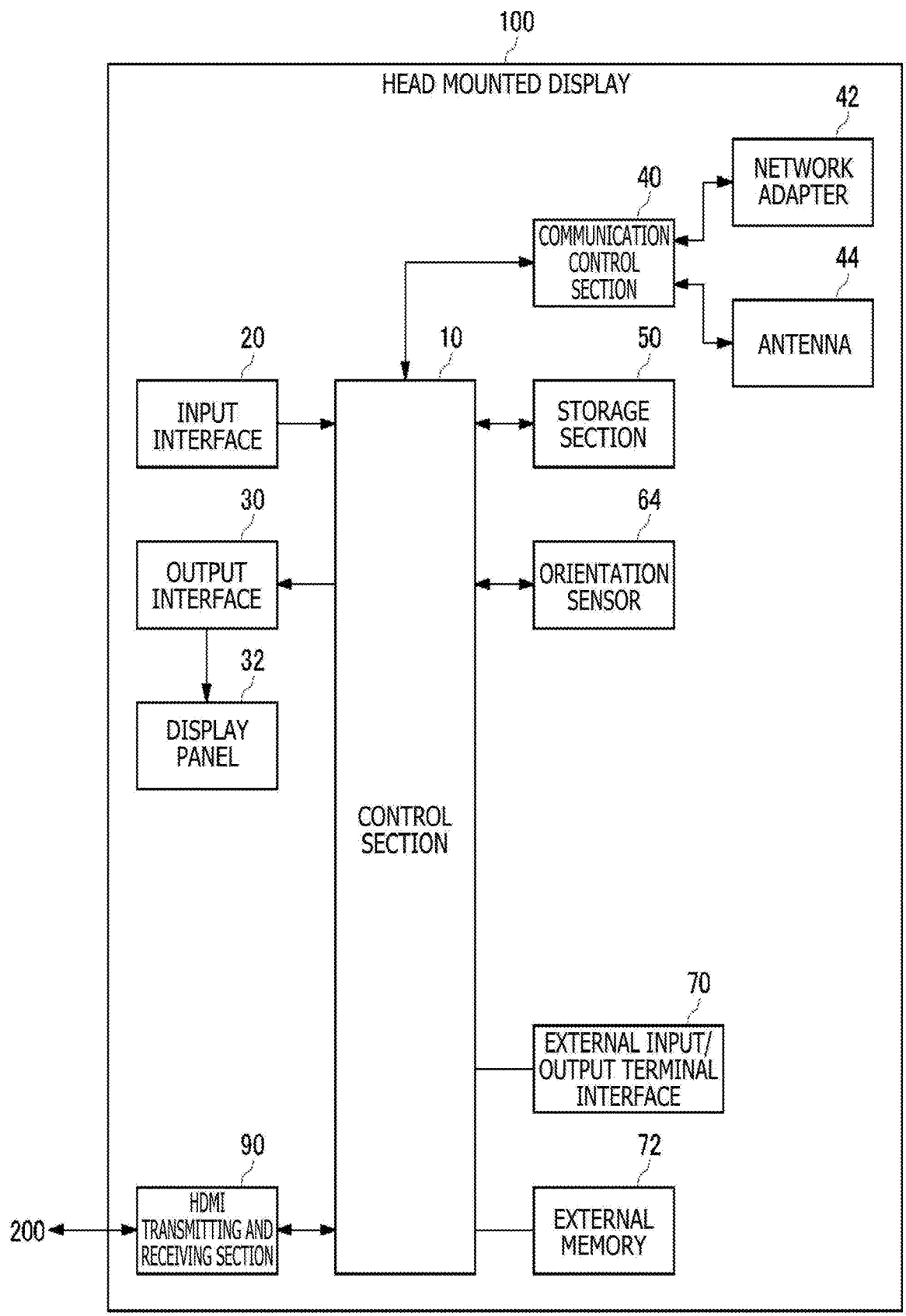
FIG. 3 is a functional configuration diagram of a head mounted display.

FIG. 3 is a functional configuration diagram of the head mounted display 100.

A control section 10 is a main processor that processes signals such as an image signal and a sensor signal, an instruction, and data and that outputs the processed signals, instruction, and data. An input interface 20 receives an operation signal and a setting signal from a user and supplies the operation signal and the setting signal to the control section 10. An output interface 30 receives the image signal from the control section 10 and displays the image signal on a display panel 32.

A communication control section 40 transmits the data input from the control section 10 to outside via a network adapter 42 or an antenna 44 by wired or wireless communication. The communication control section 40 receives data from the outside via the network adapter 42 or the antenna 44 by the wired or wireless communication and outputs the data to the control section 10.

A storage section 50 temporarily stores the data, parameters, the operation signal, and the like processed by the control section 10.

An orientation sensor 64 detects position information regarding the head mounted display 100 and orientation information such as a rotational angle and an inclination of the head mounted display 100. The orientation sensor 64 is realized by combining a gyro sensor, an acceleration sensor, an angular acceleration sensor, and the like as appropriate. Alternatively, back and forth, right and left, and up and down motions of the user's head may be detected using a motion sensor that is a combination of at least one or more sensors out of a three-axis geomagnetic sensor, a three-axis acceleration sensor, and a three-axis gyro (angular velocity) sensor.

An external input/output terminal interface 70 is an interface for connecting a peripheral device such as a USB (Universal Serial Bus) controller. An external memory 72 is an external memory such as a flash memory.

An HDMI transmitting and receiving section 90 transmits and receives video and audio digital signals to and from the image correction apparatus 200 in accordance with the HDMI. The HDMI transmitting and receiving section 90 receives an image generated by the image correction apparatus 200 from the image correction apparatus 200 using an HDMI channel, and supplies the image to the control section 10.

The control section 10 can supply an image and text data to the output interface 30 to display the image and the text data on the display panel 32, and can supply the image and the text data to the communication control section 40 to transmit the image and the text data to the outside.

The image correction apparatus 200 is notified of current position/orientation information regarding the head mounted display 100 detected by the orientation sensor 64 via either the communication control section 40 or the external input/output terminal interface 70. Alternatively, the HDMI transmitting and receiving section 90 may transmit the current position/orientation information regarding the head mounted display 100 to the image correction apparatus 200.

Figure 4:
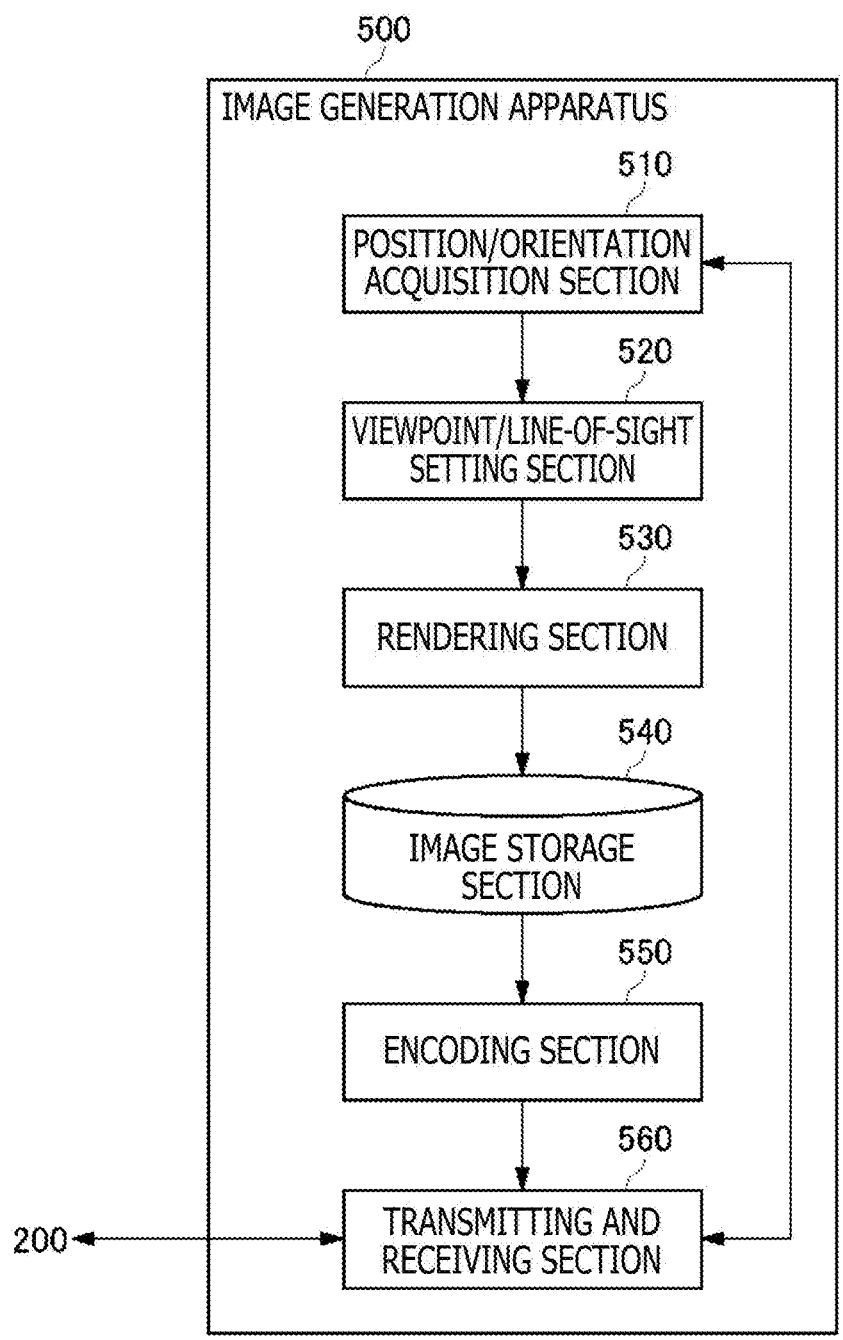
FIG. 4 is a functional configuration diagram of an image generation apparatus according to the present embodiment.

FIG. 4 is a functional configuration diagram of the image generation apparatus 500 according to the present embodiment. FIG. 4 is a view depicting blocks paying attention to functions, and these functional blocks can be realized in various forms by hardware only, software only, and a combination of the hardware and the software.

At least partial functions of the image generation apparatus 500 may be implemented in the image correction apparatus 200.

A transmitting and receiving section 560 receives current (referred to as "first time") position/orientation information regarding the head mounted display 100 from the image correction apparatus 200, and supplies the position/orientation information to a position/orientation acquisition section 510.

A viewpoint/line-of-sight setting section 520 sets a viewpoint location and a line-of-sight direction of the user using the position/orientation information regarding the head mounted display 100 acquired by the position/orientation acquisition section 510.

A rendering section 530 renders an object in a virtual space viewed from a viewpoint location of the user wearing the head mounted display 100 in a line-of-sight direction in accordance with the viewpoint location and the line-of-sight direction of the user set by the viewpoint/line-of-sight setting section 520, and stores the object in the virtual space in an image storage section 540.

An encoding section 550 encodes a rendering result stored in the image storage section 540, and applies the encoded video stream to the transmitting and receiving section 560.

The transmitting and receiving section 560 receives the first time position/orientation information regarding the head mounted display 100 used in rendering by the rendering section 530 from the position/orientation acquisition section 510, and transmits video stream data together with the first time position/orientation information to the image correction apparatus 200. The video stream in which video data and the position/orientation information are associated per frame is thereby delivered from the image generation apparatus 500 that is the server to the image correction apparatus 200 that is the client.

Figure 5:
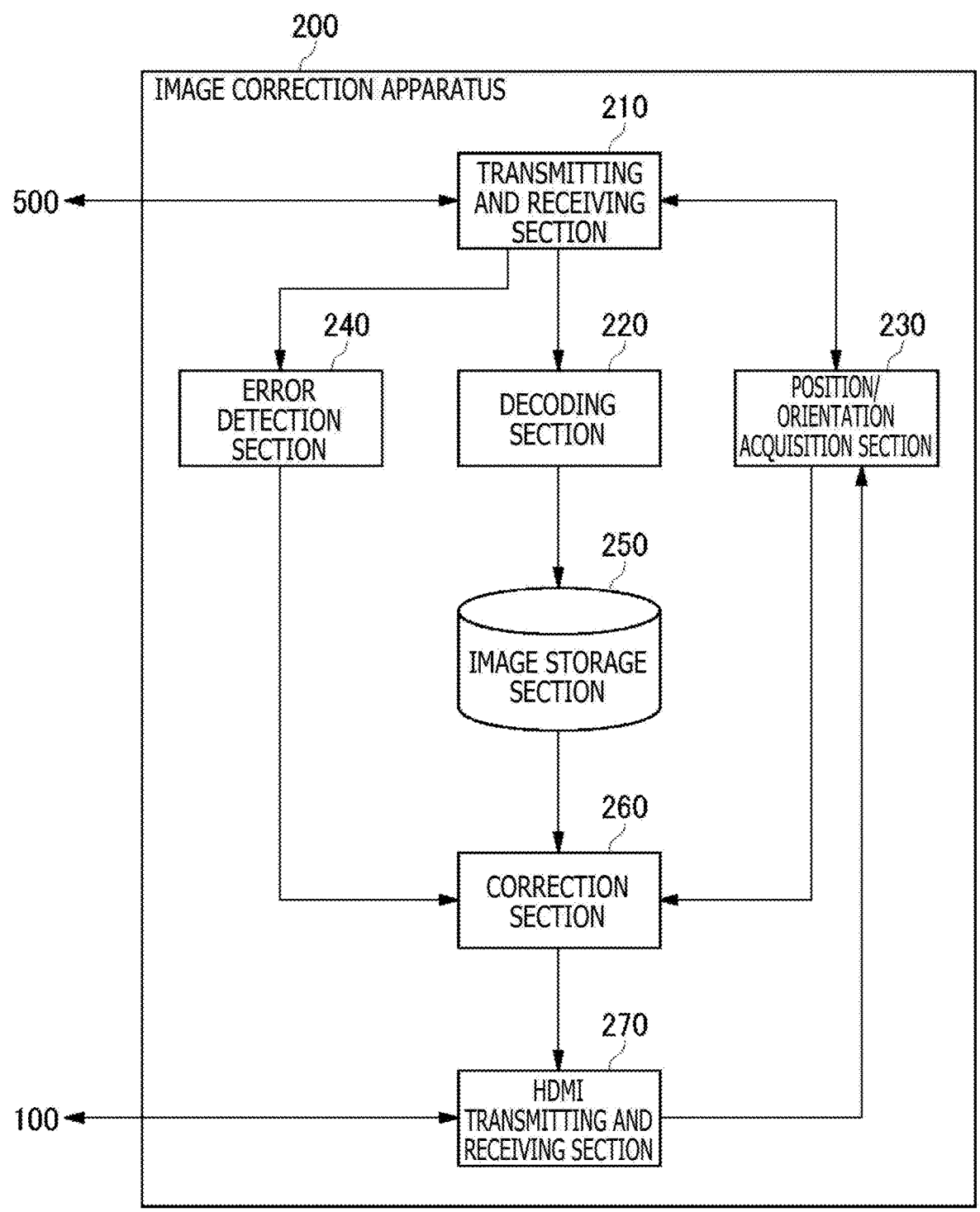
FIG. 5 is a functional configuration diagram of an image correction apparatus according to the present embodiment.

FIG. 5 is a functional configuration diagram of the image correction apparatus 200 according to the present embodiment. FIG. 5 is a view depicting blocks paying attention to functions, and these functional blocks can be realized in various forms by hardware only, software only, and a combination of the hardware and the software.

At least partial functions of the image correction apparatus 200 may be implemented in the control section 10 in the head mounted display 100.

A transmitting and receiving section 210 receives the video stream data and the first time position/orientation information regarding the head mounted display 100 used in rendering from the image generation apparatus 500 per frame. The transmitting and receiving section 210 applies the received video stream data to a decoding section 220, and applies the first time position/orientation information regarding the head mounted display 100 to a position/orientation acquisition section 230.

The decoding section 220 decodes the video stream data and stores a decoded image together with the first time position/orientation information in an image storage section 250.

An HDMI transmitting and receiving section 270 receives latest (referred to as "second time") position/orientation information from the head mounted display 100 and applies the second time position/orientation information to the position/orientation acquisition section 230.

The position/orientation acquisition section 230 applies the first time position/orientation information and the second time position/orientation information to a correction section 260.

The correction section 260 reads the decoded image from the image storage section 250, performs a reprojection process for correcting the image data in response to a difference between the first time position/orientation information and the second time position/orientation information, and converts the decoded image into an image viewed at the latest viewpoint location of the head mounted display 100 in the line-of-sight direction. The correction section 260 applies corrected image data to the HDMI transmitting and receiving section 270, and the HDMI transmitting and receiving section 270 transmits the corrected image data to the head mounted display 100.

An error detection section 240 detects, as an error, a case in which the video stream data delays due to network congestion or the like and in which the transmitting and receiving section 210 is unable to receive necessary video stream data at timing of frame rendering. The error detection section 240 notifies the correction section 260 of occurrence of the error. In a case of occurrence of the error due to the delay, the correction section 260 reads a previous frame of the decoded image from the image storage section 250, performs the reprojection process for correcting the previous frame of the decoded image in response to a difference between past time position/orientation information used in rendering of the previous frame of the decoded image and the second time position/orientation information, and converts the decoded image into an image viewed at the latest viewpoint location of the head mounted display 100 in the line-of-sight direction.

Reprojection will now be described. In a case in which the head mounted display 100 takes on a head tracking function and a virtual reality video is generated by changing the viewpoint and the line-of-sight direction to be interlocked with the motion of the user's head, a delay is generated from generation and display of the virtual reality video. As a result, a lag is generated between the direction of the user's head premised the point in time of generating the video and the direction of the user's head at the point in time of displaying the video on the head mounted display 100, and the user often falls into the sense of feeling sick (referred to as "VR Sickness (Virtual Realty Sickness)" or the like).

In such a way, it takes long time to detect a motion of the head mounted display 100, issue a rendering command from a CPU (Central Processing Unit), execute rendering by a GPU (Graphics Processing Unit), and output a rendered image to the head mounted display 100. It is assumed, for example, that rendering is executed at a frame rate of 60 fps (frame/second) and that a delay of one frame is generated from detection of the motion of the head mounted display 100 is detected to output of the image. This delay is approximately 16.67 milliseconds at the frame rate of 60 fps and sufficient for a person to perceive a lag.

Furthermore, if the server encodes rendered image data and transmits the image data to the client via the network, communication time is added to the time taken for rendering and a further delay is, therefore, generated until the image data is displayed on the head mounted display 100.

To address the problem, a process referred to as "timewarp" or "reprojection" is performed to correct the rendered image to be adapted to the latest position and the latest orientation of the head mounted display 100 so that it is difficult for a person to perceive the lag.

Figure 6:
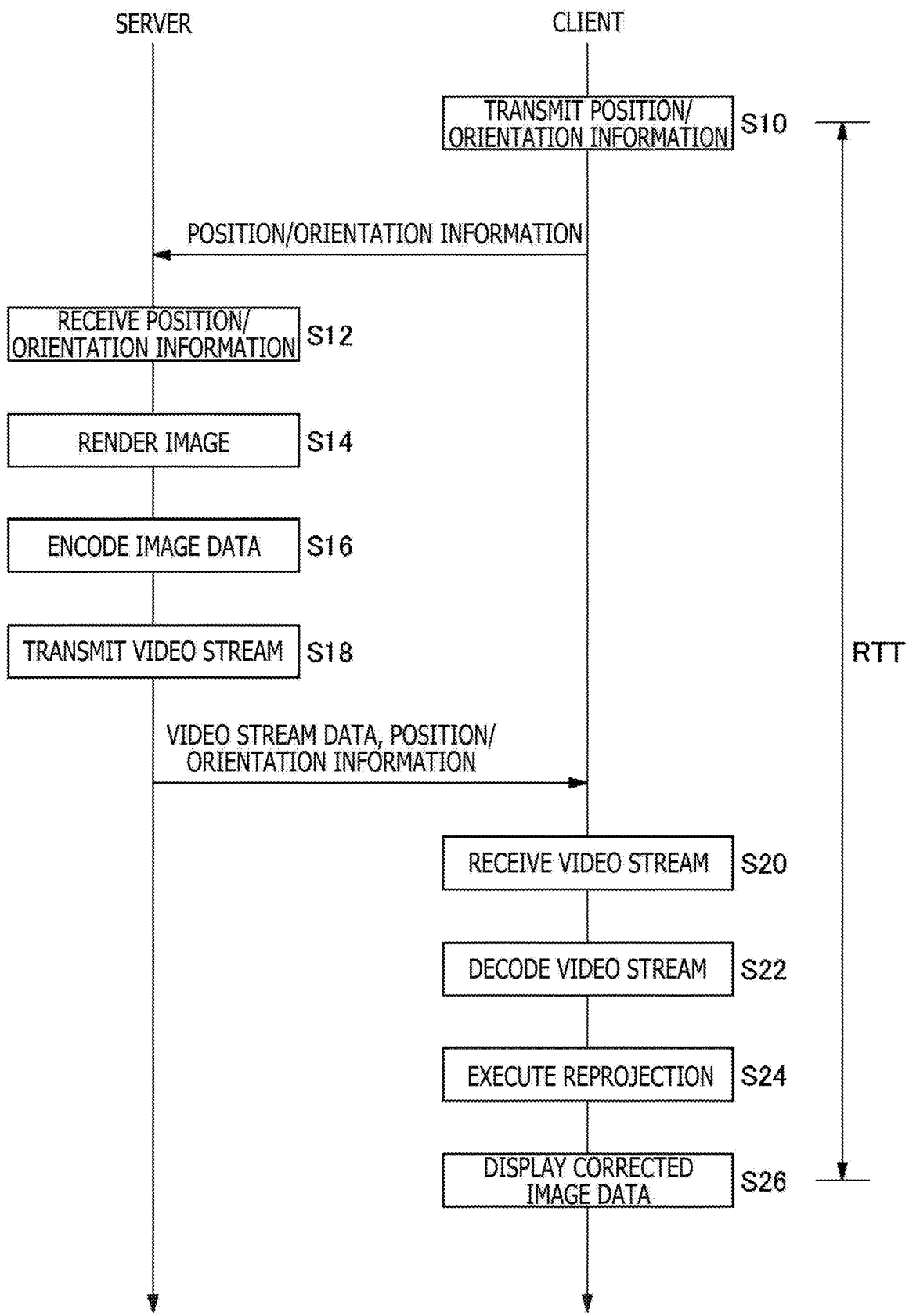
FIG. 6 is a flowchart for explaining an image generation procedure according to the present embodiment.

FIG. 6 is a flowchart for explaining an image generation procedure according to the present embodiment.

The transmitting and receiving section 210 in the image correction apparatus 200 that is the client transmits the current position/orientation information regarding the head mounted display 100 to the image generation apparatus 500 that is the server (S10).

In the image generation apparatus 500, the transmitting and receiving section 560 receives the current position/orientation information regarding the head mounted display 100 from the image correction apparatus 200 (S12). The rendering section 530 renders an image to be displayed on the head mounted display 100 on the basis of the current position/orientation information regarding the head mounted display 100 (S14).

The encoding section 550 encodes image data obtained as a result of rendering (S16). The transmitting and receiving section 560 transmits an encoded video stream together with the position/orientation information regarding the head mounted display 100 used in rendering to the image correction apparatus 200 (S18).

In the image correction apparatus 200, the transmitting and receiving section 210 receives the video stream and the position/orientation information regarding the head mounted display 100 used in rendering from the image generation apparatus 500 (S20). The decoding section 220 decodes the video stream (S22). The correction section 260 executes the reprojection process for correcting the rendering data to be adapted to the latest position/orientation of the head mounted display 100 (S24). The HDMI transmitting and receiving section 270 transmits the corrected image data to the head mounted display 100 to display the image data on the head mounted display 100 (S26).

A round trip time (RTT) delay is generated since the image correction apparatus 200 transmits the position/orientation information regarding the head mounted display 100 to the image generation apparatus 500 in step S10 until the image is displayed on the head mounted display 100. The reprojection process in step S24 interpolates the image so that the user does not feel this delay.

Figure 7:
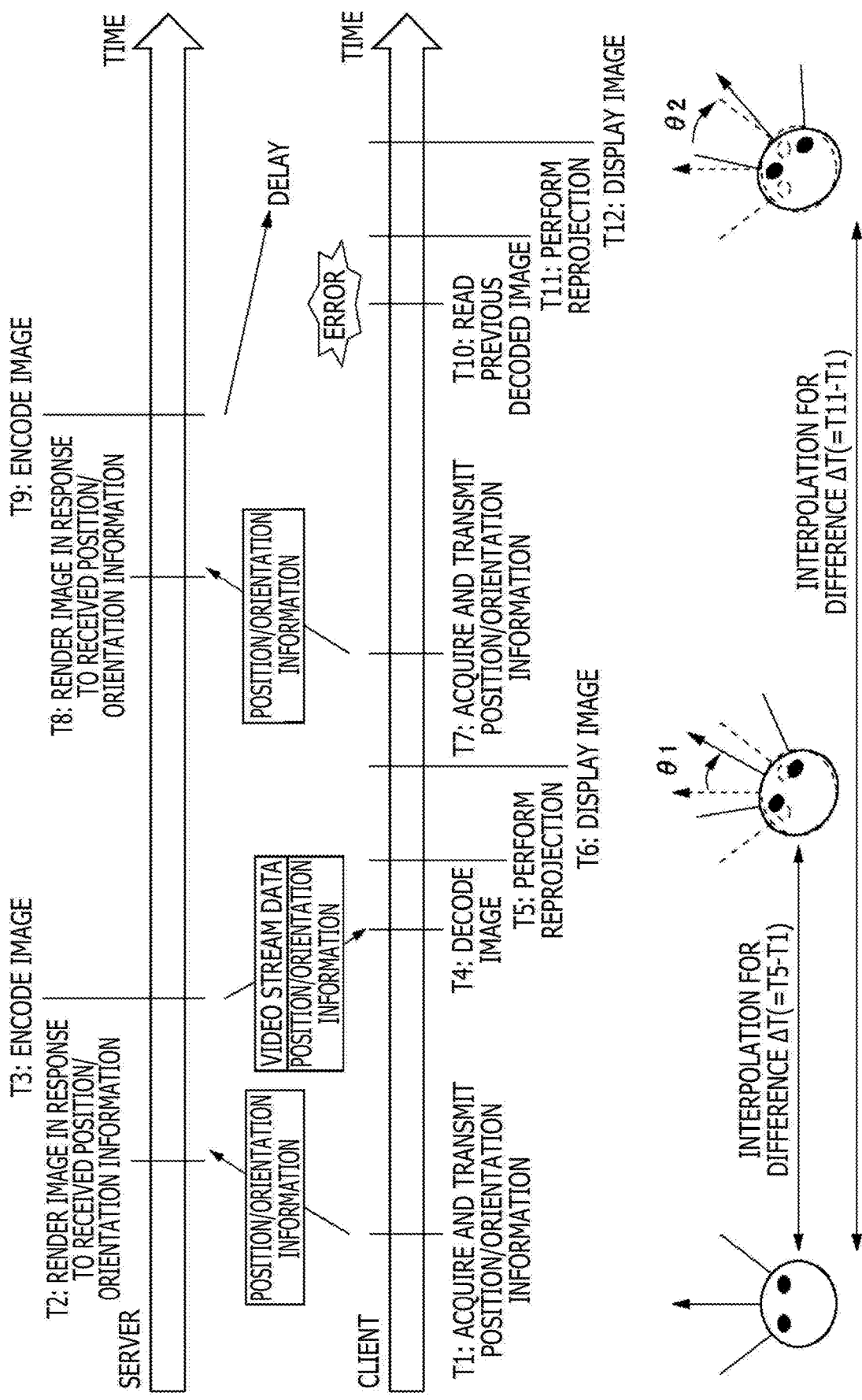
FIG. 7 is a detailed time chart of the image generation procedure according to the present embodiment.

FIG. 7 is a detailed time chart of the image generation procedure according to the present embodiment.

At time T1, the image correction apparatus 200 that is the client acquires the position/orientation information regarding the head mounted display 100 and transmits the position/orientation information to the image generation apparatus 500 that is the server.

At time T2, the image generation apparatus 500 renders an image to be displayed on the head mounted display 100 in response to the received position/orientation information regarding the head mounted display 100. At time T3, the image generation apparatus 500 encodes the rendered image, and transmits the encoded video stream data together with the position/orientation information regarding the head mounted display 100 used in rendering to the image correction apparatus 200.

At time T4, the image correction apparatus 200 decodes the received video stream. At time T5, the image correction apparatus 200 performs the reprojection process on the decoded image. The decoded image is rendered on the basis of the position/orientation information regarding the head mounted display 100 at the time T1. At the time T5, the user wearing the head mounted display 100 rotates the head by an angle θ1, and the decoded image is interpolated in response to a change in the position/orientation information regarding the head mounted display 100 for a difference ΔT=T5−T1. At time T6, the image correction apparatus 200 displays the reprojection-processed decoded image on the head mounted display 100.

At time T7, the image correction apparatus 200 acquires the position/orientation information regarding the head mounted display 100 and transmits the position/orientation information to the image generation apparatus 500.

At time T8, the image generation apparatus 500 renders an image to be displayed on the head mounted display 100 in response to the received position/orientation information regarding the head mounted display 100. At time T9, the image generation apparatus 500 encodes the rendered image and transmits the encoded video stream data together with the position/orientation information regarding the head mounted display 100 used in rendering to the image correction apparatus 200; however, a delay caused by network congestion is generated and the video stream data is late for next frame timing.

At time T10, the image correction apparatus 200 detects occurrence of an error in data reception, and reads the decoded image at the time T4 that is a previous frame (referred to as "previous decoded image") from a memory. At time T11, the image correction apparatus 200 performs the reprojection process on the previous decoded image. The previous decoded image is rendered on the basis of the position/orientation information regarding the head mounted display 100 at the time T1. At the time T11, the user wearing the head mounted display 100 rotates the head by an angle θ2, and the image is interpolated in response to a change in the position/orientation information regarding the head mounted display 100 for a difference ΔT=T11−T1. At time T12, the image correction apparatus 200 displays the reprojection-processed image on the head mounted display 100.

Figure 8:
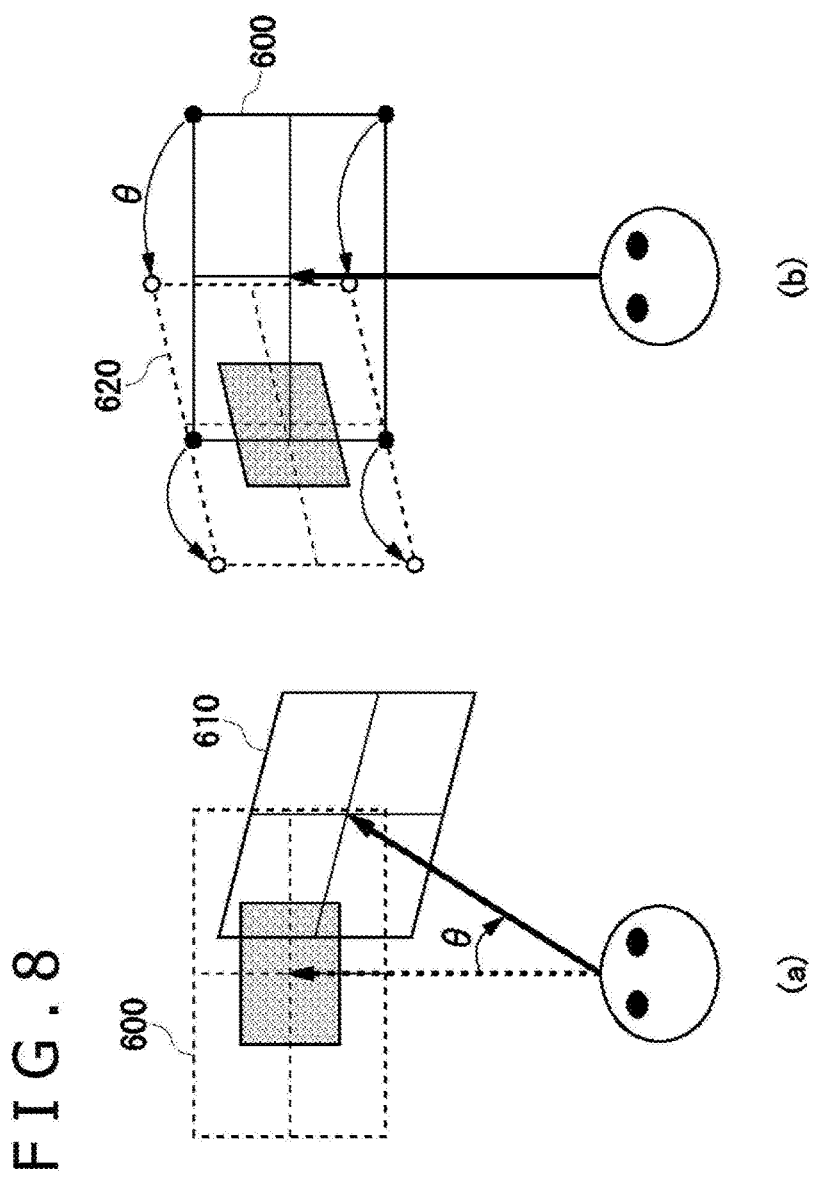
FIGS. 8(*a*) to 8(*c*) are explanatory diagrams of rotational movement of a billboard.

The reprojection process performed by the correction section 260 in the image correction apparatus 200 will be described in detail with reference to FIGS. 8 to 10. In the present embodiment, the client receives the image already rendered by the server and interpolates the image; thus, the present embodiment uses a method of interpolating the image by as much as a movement of a visual field by rotating a billboard without performing pixel-by-pixel reprojection. Since linear interpolation of the image is performed by converting coordinate values of four vertexes in screen coordinates, the method can easily be implemented using a linear interpolation function of a GPU of the client.

FIGS. 8(a) to 8(c) are explanatory diagrams of rotational movement of the billboard.

FIG. 8(a) depicts a first visual field 600 when the user wearing the head mounted display 100 is facing the front and a second visual field 610 when the user rotates the head to the right by an angle of θ. While the server renders an image on the first visual field 600 at the first time at which the user is facing the front, timing of displaying the rendered image is the second time at which the user rotates the head by the angle of θ. At the second time, it is necessary to correct the rendered image and display the image on the second visual field 610 that is a plane perpendicular to a direction of the angle θ.

FIG. 8(b) depicts a method of rotating the billboard to interpolate rotational movement of the visual field by the angle θ in FIG. 8(a). The billboard in the front first visual field 600 is rotated in an opposite direction by the angle θ, and the image rendered on the first visual field 600 is pasted on a rotated billboard 620 as a texture. The image rendered on the first visual field 600 is thereby linearly interpolated and displayed on the second visual field 610 of FIG. 8(a).

FIG. 8(c) depicts an interpolated image displayed on the head mounted display 100 when the user rotates the head to the right by the angle θ. The image rendered on the first visual field 600 is linearly interpolated and displayed on the second visual field 610.

The rotational movement of the billboard of FIG. 8(b) is made by inversely rotating four vertexes of the first visual field 600 by the angle θ. x and y coordinates of the four vertexes are screen coordinates, z coordinate is a distance d from a rotation center, and a value calculated from a viewing angle Fov is used as the distance d.

It is noted that in a case in which the user wearing the head mounted display 100 translates the head, the billboard of the first visual field 600 may be translated in the opposite direction and the texture on the first visual field 600 may be pasted.

Figure 9:
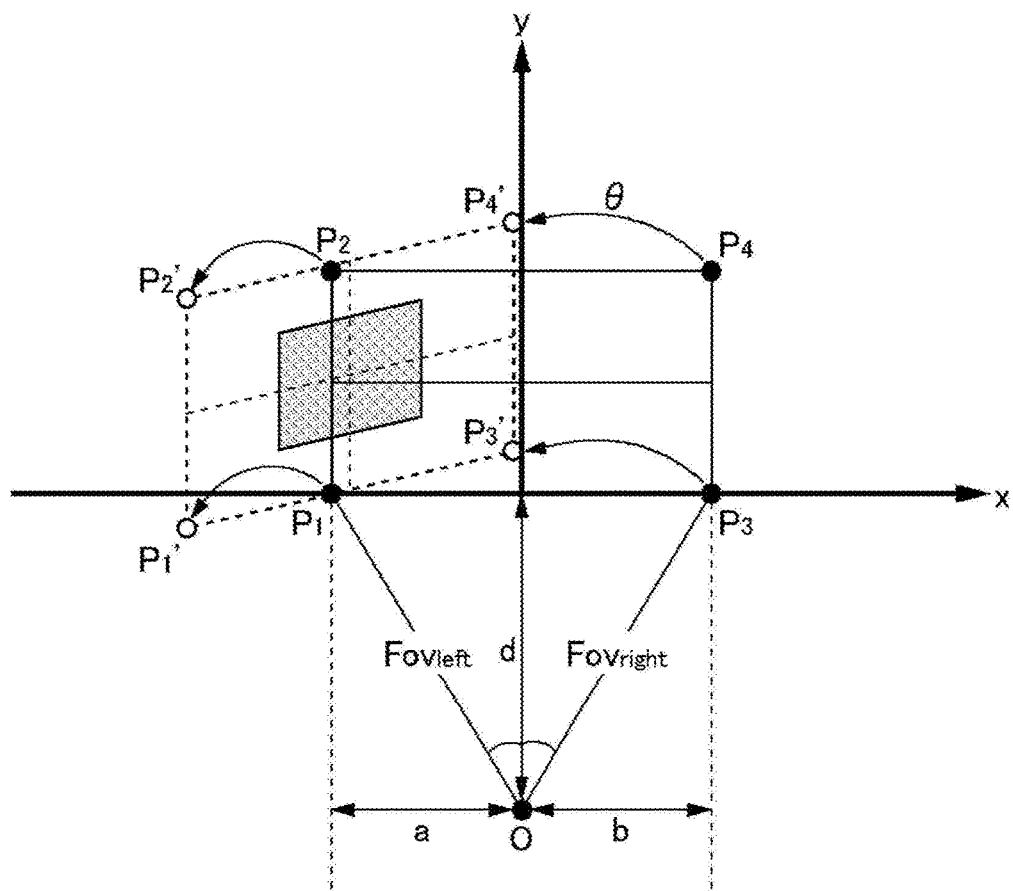
FIG. 9 is a detailed explanatory diagram of the rotational movement of the billboard.

FIG. 9 is a detailed explanatory diagram of the rotational movement of the billboard.

Screen coordinates of four vertexes $P_1$, $P_2$, $P_3$, and $P_4$ of the billboard in the visual field are (−1, −1), (−1, 1), (1, −1), and (1, 1), and represented as (−1, −1, d), (−1, 1, d), (1, −1, d), and (1, 1, d), respectively in a coordinate system extended in three dimensions using the distance d from a viewpoint to a screen as the z coordinate.

The distance d from the viewpoint to the screen is calculated by the following equations using left and right viewing angles $Fov_{left}$ and $Fov_{right}$.

$a = 2 \times Fov_{left}/(Fov_{left} + Fov_{right})$
$b = 2 \times Fov_{right}/(Fov_{left} + Fov_{right})$
$d = b/\tan(Fov_{right})$ The four vertexes $P_1$, $P_2$, $P_3$, and $P_4$ of the billboard are rotated inversely by the angle θ in a three-dimensional space, and coordinate values of rotated four vertexes $P_1'$, $P_2'$, $P_3'$, and $P_4'$ of the billboard are calculated. If an orientation of the head mounted display 100 is represented by quaternions, a rotational angle is calculated as a difference between the orientation of the head mounted display 100 on the first visual field 600 and the orientation of the head mounted display 100 on the second visual field 610.

A method of calculating three-dimensional rotations or the like related to computer graphics using quaternions is described in "Introduction to Quaternions for 3D-CG programmers" (Kohgaku-Sha Co., Ltd., January 2004).

The orientations $q_A$ and $q_B$ of the head mounted display 100 on the first visual field 600 and the second visual field 610 are represented by the following equations.

$$q_A = (qx_A, qy_A, qz_A, qw_A)$$

$$q_B = (qx_B, qy_B, qz_B, qw_B)$$

The rotational angle $q_{AB}$ of the head mounted display 100 is obtained by calculating a difference between the orientations $q_A$ and $q_B$ of the head mounted display 100 on the first visual field 600 and the second visual field 610 by the following equation.

$$q_{AB} = q_A * q_B^{-1}$$

A reciprocal of the quaternion $q_B^{-1}$ is as follows.

$$q_B^{-1} = (-qx_B, -qy_B, -qz_B, qw_B)$$

The rotational angle $q_{AB}$ is, therefore, obtained by the following equation.

$$q_{AB} = q_A * q_B^{-1}$$

$$= (qx_A, qy_A, qz_A, qw_A) * (-qx_B, -qy_B, -qz_B, qw_B)$$

$$= (qw_A * qx_B + qx_A * qw_B + qy_A * (-qz_B) - qz_A * (-qy_B),$$

$$qw_A * qy_B - qx_A * (-qz_B) + qy_A * qw_B + qz_A * (-qx_B),$$

$$qw_A * qz_B + qx_A * (-qy_B) - qy_A * (-qx_B) + qz_A * qw_B,$$

$$qw_A * qx_B - qx_A * (-qy_B) - qy_A * (-qy_B) - qz_A * (-qz_B))$$

By rotating the four vertexes $P_1$, $P_2$, $P_3$, and $P_4$ of the billboard by the rotational angle $q_{AB}$, coordinate values of $P_1'$, $P_2'$, $P_3'$, and $P_4'$ are obtained. To rotate the four vertexes in quaternions, the coordinate values of the four vertexes are represented by four-dimensional vectors as follows.

$$P_1 = (-1, -1, d, 0)$$

$$P_2 = (-1, 1, d, 0)$$

$$P_3 = (1, -1, d, 0)$$

$$P_4 = (1, 1, d, 0)$$

Since rotation of a point p by a quaternion q is given by $q^{-1} * p * q$, the rotated four vertexes $P_1'$, $P_2'$, $P_3'$, and $P_4'$ are obtained by the following equation. In the following equation, n is any of 1 to 4. px and py are screen coordinates and given as either 1 or −1 as described above. pz is the distance d from the viewpoint to the screen. Furthermore, the rotational angle is defined as $q_{AB} =$ $$(qx_{AB}, qy_{AB}, qz_{AB}, qw_{AB}).$$

$$Pn' = q_{AB}^{-1} * Pn * q_{AB}$$

$$= (-qx_{AB}, -qy_{AB}, -qz_{AB}, qw_{AB}) * (px, py, pz, 0) * (qx_{AB}, qy_{AB}, qz_{AB}, qw_{AB})$$

$$= (qw_{AB} * px + (-qy_{AB}) * pz - (-qz_{AB}) * py,$$

$$qw_{AB} * py - (-qx_{AB}) * pz + (-qz_{AB}) * px,$$

$$qw_{AB} * pz + (-qx_{AB}) * py - (-qy_{AB}) * px,$$

$$-(-qx_{AB}) * px - (-qy_{AB}) * py - (-qz_{AB}) * pz) * (qx_{AB}, qy_{AB}, qz_{AB}, qw_{AB})$$

$$= ((qx_{AB}^2 - qy_{AB}^2 - qz_{AB}^2 + qw_{AB}^2)px + 2(qx_{AB} * qy_{AB} + qz_{AB} * qw_{AB})py + 2(qx_{AB} * qz_{AB} - qy_{AB} * qw_{AB})pz,$$

$$2(qx_{AB} * qy_{AB} - qz_{AB} * qw_{AB})px - (qx_{AB}^2 - qy_{AB}^2 + qz_{AB}^2 - qw_{AB}^2)py + 2(qy_{AB} * qz_{AB} + qx_{AB} qw_{AB})pz,$$

$$2(qx_{AB} * qz_{AB} + qy_{AB} + qy_{AB} * qw_{AB})px + 2(qy_{AB} * qz_{AB} - qx_{AB} * qw_{AB})py - (qx_{AB}^2 + gy_{AB}^2 - qz_{AB}^2 - qw_{AB}^2)pz, -2 * qy_{AB} * qz_{AB} * px_{AB})$$

Figure 10:
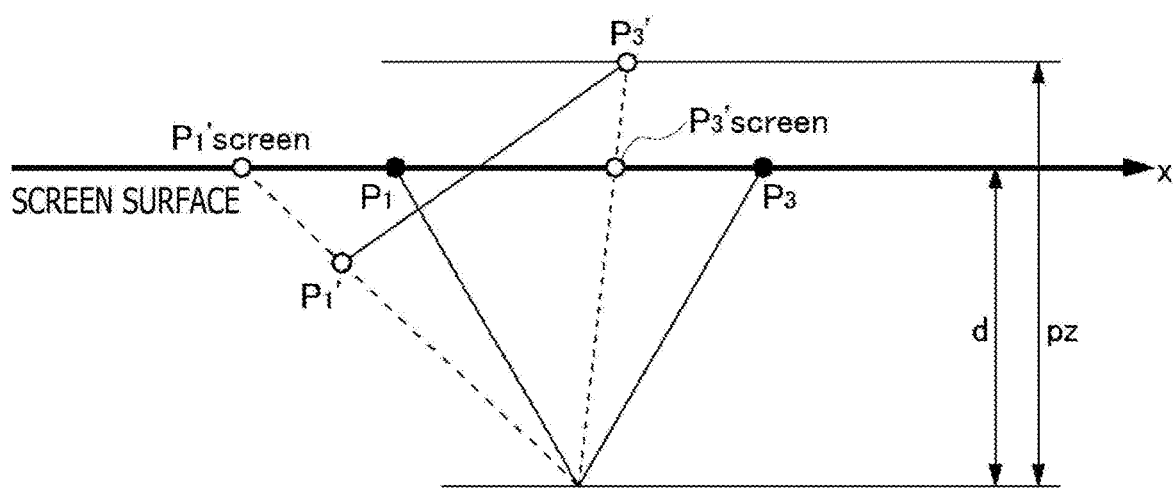
FIG. 10 is an explanatory diagram of projection of the rotated billboard onto a screen.

FIG. 10 is an explanatory diagram of projection of the rotated billboard onto the screen.

Since the rotated four vertexes $P_1'$, $P_2'$, $P_3'$, and $P_4'$ of the billboard are present in the three-dimensional space, it is necessary to project again the four vertexes $P_1'$, $P_2'$, $P_3'$, and $P_4'$ onto the screen. As represented by the following equation, coordinate values of four vertexes $Pn'_{screen}$ on the screen are obtained by multiplying a ratio of the distance d from the viewpoint to the screen to a depth pz' of the rotated billboard by the coordinate values px' and py' of the four vertexes Pn' of the rotated billboard. In the equation, n is any of 1 to 4.

$$Pn'_{screen} = (px', py') * d/pz'$$

$$= (px' * d/pz', py' * d/pz')$$

The present invention has been described so far. An ordinary reprojection process is performed to compensate for processing time from rendering to display, and absorbs a time difference from a point in time of image generation to a point in time of image display by correcting an image generated on the premise of the viewpoint location and the line-of-sight direction at the point in time of image generation using the viewpoint location and the line-of-sight direction at the point in time of image display. By contrast, in a case of streaming delivery of images to the head mounted display 100 via the network as in the present embodiment, the reprojection process is performed to absorb a time difference including the communication time.

In the case of the streaming delivery, the client transmits the current position/orientation information regarding the head mounted display 100 to the server, and the server renders an image on the basis of the received position/orientation information and transmits the video stream together with the position/orientation information used at the time of rendering to the client. The client performs the reprojection process on the image rendered by the server to compensate the difference between the position/orientation information used at the time of rendering and the latest position/orientation information. It is thereby possible to absorb the time difference from the point in time at which the client requests the server to perform rendering to the communication time-inclusive point in time of displaying the image.

Furthermore, in the case of the streaming delivery, a communication delay occurs due to the network congestion or the like and an error that the video stream does not arrive on time possibly occurs. In the case of occurrence of the data arrival error, it is possible to flexibly deal with the communication delay by reusing the previous decoded image and performing the reprojection process on the previous decoded image to be adapted to the latest position/orientation of the head mounted display 100.

The present invention has been described so far with reference to the embodiment. The embodiment is given as an example, and a person skilled in the art would understand that various modifications can be made for combinations of the constituent elements and the processes and that such modifications fall within the scope of the present invention. Such modifications will be described.

REFERENCE SIGNS LIST

10 Control section, 20 Input interface, 30 Output interface, 32 Display panel, 40 Communication control section, 42 Network adapter, 44 Antenna, 50 Storage section, 64 Orientation sensor, 70 External input/output terminal interface, 72 External memory, 90 HDMI transmitting and receiving section, 100 Head mounted display, 200 Image correction apparatus, 210 Transmitting and receiving section, 220 Decoding section, 230 Position/orientation acquisition section, 240 Error detection section, 250 Image storage section, 260 Correction section, 270 HDMI transmitting and receiving section, 300 Interface, 400 Network, 500 Image generation apparatus, 510 Position/orientation acquisition section, 520 Viewpoint/line-of-sight setting section, 530 Rendering section, 540 Image storage section, 550 Encoding section, 560 Transmitting and receiving section.

INDUSTRIAL APPLICABILITY

The present invention is applicable to an image correcting technology.

The invention claimed is:

1. An image correction apparatus comprising:
   an acquisition section that acquires an image rendered on a basis of a position or an orientation of a head mounted display at a first time together with information regarding the position or the orientation at the first time; and
   a correction section that corrects the image by acquiring information regarding a position or an orientation of the head mounted display at a second time of displaying the image, translating or rotationally moving a visual field of the head mounted display in a screen coordinate system in response to a difference between the position or the orientation at the first time and the position or the orientation at the second time, and pasting the image on the translated or rotationally moved visual field as a texture; and
   a storage section that retains a decoded image at previous time obtained by decoding an encoded stream which is obtained by encoding the image received via a network together with information regarding a position or an orientation of the head mounted display at the previous time, wherein
   in a case in which an error in receiving the encoded stream is detected, the correction section corrects the decoded image at the previous time by translating or rotationally moving the visual field in the screen coordinate system in response to a difference between the position or the orientation at the previous time and the position or the orientation at the second time, and pasting the decoded image at the previous time on the translated or rotationally moved visual field as the texture.

2. An image correction method comprising:
   acquiring an image rendered on a basis of a position or an orientation of a head mounted display at a first time together with information regarding the position or the orientation at the first time; and
   correcting the image by acquiring information regarding a position or an orientation of the head mounted display at a second time of displaying the image, translating or rotationally moving a visual field of the head mounted display in a screen coordinate system in response to a difference between the position or the orientation at the first time and the position or the orientation at the second time, and pasting the image on the translated or rotationally moved visual field as a texture; and
   retaining a decoded image at previous time obtained by decoding an encoded stream which is obtained by encoding the image received via a network together with information regarding a position or an orientation of the head mounted display at the previous time, wherein
   in a case in which an error in receiving the encoded stream is detected, the correcting includes correcting the decoded image at the previous time by translating or rotationally moving the visual field in the screen coordinate system in response to a difference between the position or the orientation at the previous time and the position or the orientation at the second time, and pasting the decoded image at the previous time on the translated or rotationally moved visual field as the texture.

3. A non-transitory, computer readable storage medium containing a computer program, which when executed by a computer, causes the computer to carry out actions, comprising:
   acquiring an image rendered on a basis of a position or an orientation of a head mounted display at a first time together with information regarding the position or the orientation at the first time; and
   correcting the image by acquiring information regarding a position or an orientation of the head mounted display at a second time of displaying the image, translating or rotationally moving a visual field of the head mounted display in a screen coordinate system in response to a difference between the position or the orientation at the first time and the position or the orientation at the second time, and pasting the image on the translated or rotationally moved visual field as a texture; and
   retaining a decoded image at previous time obtained by decoding an encoded stream which is obtained by encoding the image received via a network together with information regarding a position or an orientation of the head mounted display at the previous time, wherein
   in a case in which an error in receiving the encoded stream is detected, the correcting includes correcting the decoded image at the previous time by translating or rotationally moving the visual field in the screen coordinate system in response to a difference between the position or the orientation at the previous time and the position or the orientation at the second time, and pasting the decoded image at the previous time on the translated or rotationally moved visual field as the texture.

* * * * *